(12) United States Patent
Huber, Jr. et al.

(10) Patent No.: US 7,249,659 B2
(45) Date of Patent: Jul. 31, 2007

(54) FLUID ACTUATOR

(75) Inventors: Howard E. Huber, Jr., Black River, NY (US); Jeffrey F. Sauter, Lowville, NY (US); Robert L. Neulieb, Theresa, NY (US); Steven R. Newton, Adams, NY (US)

(73) Assignee: New York Air Brake Corporation, Watertown, NY (US)

( * ) Notice: Subject to any disclaimer, the term of this patent is extended or adjusted under 35 U.S.C. 154(b) by 18 days.

(21) Appl. No.: 10/752,543

(22) Filed: Jan. 8, 2004

(65) Prior Publication Data
US 2005/0150730 A1    Jul. 14, 2005

(51) Int. Cl.
*B60T 11/10* (2006.01)

(52) U.S. Cl. .................. 188/153 R; 188/33; 188/265; 303/89

(58) Field of Classification Search ............... 188/33, 188/153 R, 265; 303/89; 91/41, 1, 45
See application file for complete search history.

(56) References Cited

U.S. PATENT DOCUMENTS

| | | | |
|---|---|---|---|
| 2,673,624 A * | 3/1954 | Huber ................... | 188/67 |
| 3,238,847 A * | 3/1966 | Moore et al. ........... | 91/41 |
| 3,944,286 A | 3/1976 | Engle et al. | |
| 4,019,426 A | 4/1977 | Wosegien et al. | |
| 4,653,812 A | 3/1987 | Engle | |
| 4,746,171 A | 5/1988 | Engle | |
| 4,799,741 A | 1/1989 | Engle | |
| 4,874,065 A | 10/1989 | Engle | |
| 4,978,178 A | 12/1990 | Engle | |
| 5,069,312 A | 12/1991 | Kanjo et al. | |
| 5,349,894 A * | 9/1994 | Greer ..................... | 91/43 |
| 5,495,921 A | 3/1996 | Samulak et al. | |
| 5,701,975 A | 12/1997 | Hawryszkow | |
| 5,738,416 A | 4/1998 | Kanjo et al. | |
| 6,186,284 B1 | 2/2001 | Sauter et al. | |
| 6,227,520 B1 | 5/2001 | Huber, Jr. | |
| 6,375,278 B1 | 4/2002 | Sauter et al. | |
| 6,378,668 B1 | 4/2002 | Zemyan et al. | |
| 6,394,559 B1 | 5/2002 | Ring et al. | |
| 6,397,978 B1 | 6/2002 | Jackson et al. | |
| 6,427,811 B1 | 8/2002 | Wedge et al. | |
| 6,431,329 B1 | 8/2002 | Huber, Jr. et al. | |
| 6,698,552 B2 * | 3/2004 | Huber et al. ........... | 188/33 |
| 6,854,570 B2 * | 2/2005 | Connell ................. | 188/33 |

OTHER PUBLICATIONS

"*Evaluation of a Hydraulic Freight-Car Parking Brake*", Paul B. McMahan, Technology Digest, Aug. 1998.

* cited by examiner

*Primary Examiner*—Bradley King
(74) *Attorney, Agent, or Firm*—Barnes & Thornburg LLP

(57) ABSTRACT

An actuator responsive to fluid signals to retract and extend a piston. The actuator includes a cylinder and a pressure piston carried inside the cylinder. Also included is a shaft, and a rod connected to the pressure piston. The actuator further includes a first port for receiving a fluid pressure to move the pressure piston to a first position. The actuator also has a locking mechanism. The locking mechanism has a first and second surface, and both surfaces are movable in response to the fluid pressure at the first port. The surfaces lock the pressure piston in a first position upon removal of the fluid pressure at the first port.

43 Claims, 12 Drawing Sheets

FLUID ACTUATOR

BACKGROUND

The present disclosure relates generally to fluid actuators on vehicles and machinery. The terms vehicle and machinery, herein, include, among other things, rail locomotives and rail cars, as well as agricultural and logging vehicles, machinery and implements The prior art, for example, discloses fluid actuators on parking brakes for rail vehicles. Some parking brakes operate independently of the overall brake system for the train and others are integrated with the overall brake system, particularly by using the main brake cylinder that operates the train's brakes. Some parking brakes have cylinders or actuators that lock a parking brake in an applied position.

In general, the main brake system for rail vehicles is pneumatically operated. The brake system includes a brake cylinder with a piston rod to operate the brake shoes to engage the wheels and brake the rail vehicle. The brake cylinder receives a signal to apply the brakes and generally has a spring return to release them. The signal or force to activate the brakes is generally multiplied by some sort of lever that is located between the brake cylinder and the brake shoes.

Most rail vehicles have a manually-operated parking brake that applies the wheel brakes. Generally, for truck-mounted brake systems, which are well-known in the art, one end of the brake cylinder has a piston rod output that is connected to levers or similar elements which connect the brake cylinder to the brake beams. Furthermore, as part of the parking brake system, a combination of chains, levers, hoses, rods and cables are generally used to connect a manual-hydraulically operated actuating device to the brake cylinder. The actuating device may be located at any convenient place on the rail vehicle to allow remote operation of the parking brake.

The prior art also discloses an electropneumatic controlled parking brake, that is one that has electrical and pneumatic elements.

Manual fluid pumps to actuate separate hydraulic parking brakes on railroad vehicles are also disclosed in the prior art. Those parking brakes are connected to the brake beams and may or may not be independent of, or not connected to, the main brake cylinder.

Locking mechanisms in actuators for parking brakes are also known from the prior art. Those locking mechanisms, which generally lock a parking brake in an applied position, are constructed in a variety of ways. For example, there are mechanisms that use detents for locking a parking brake and there are mechanisms that use concentric clutch surfaces or opposing clutch surfaces to lock a parking brake. A known locking mechanism for a parking brake includes a rotating nut and a slidable sleeve that are external to an actuator piston. The known parking brake has a piston shaft that is connected to the rail vehicle's brakes and a connecting rod attached to a brake cylinder that applies and releases the brakes. The shaft and rod move linearly together, thereby requiring a certain amount of space for a given piston stroke for the operation of the parking brake.

An aspect of the present disclosure relates to an actuator for a parking brake that takes up less space on a rail vehicle compared to known actuators, particularly in relation to a given piston stroke, for example, of known actuators.

SUMMARY

The present disclosure relates to an actuator that produces movement for at least two positions of a device. One of those at least two positions of the device relates to a locked or retracted position of a pressure piston of the actuator and which position can occur over a potential infinite number of pressure piston stroke distances. The actuator disclosed may be utilized on and for devices on a variety of vehicles and machinery in, for example, the rail, agricultural, industrial and logging industries. Furthermore, while the disclosure herein refers to an actuator having positions of the pressure piston designated as applied and released positions, those positions may be referred to as retracted or first positions and extended or second positions, respectively. Moreover, while the disclosure herein refers to the applied and released positions as two positions of the pressure piston and a device such as a parking brake, embodiments of the actuator of the present disclosure may be used to produce two positions or movement to two positions of any device.

According to the present disclosure, an embodiment of an actuator, for a parking brake for a rail vehicle, includes a cylinder and a pressure piston carried inside the cylinder. Also included is a shaft, and a rod connected to the pressure piston. The rod is movable axially with respect to and concentrically over the shaft. The actuator further includes an apply or first port configured to receive a fluid pressure to move the pressure piston to an applied or first position. The actuator also has a locking mechanism inside the pressure piston. The locking mechanism includes a first and a second surface, and both surfaces travel with the pressure piston along the shaft in response to the fluid pressure at the apply port. The surfaces lock the pressure piston in an applied position upon removal of the fluid pressure at the apply port.

In a further embodiment, the shaft may be movable axially.

In embodiments of the present disclosure, the actuator may also have a release or second port for receiving a fluid pressure. In response to the fluid pressure, the surfaces of the locking mechanism unlock and are configured to move along the shaft with the pressure piston to a released or second position, thereby releasing the parking brake of the vehicle.

The present disclosure will be better understood and appreciated from the following descriptions and with reference to the accompanying drawings.

DETAILED DESCRIPTION OF THE DRAWINGS

Generally, the present disclosure relates to an actuator for use in a variety of industries, including, but not limited to, the rail, agricultural and logging industries. As an example, the present disclosure relates to an actuator for a parking brake in a rail vehicle. As mentioned earlier, the term rail vehicle herein includes both locomotives and rail cars. More specifically, the actuator, for space-saving and other reasons, includes a locking mechanism inside the actuator's piston. A rod connected to the rail vehicle's brakes is adapted to move with respect to and concentrically over a shaft. That shaft is essentially stationary, but may move very slightly, as more fully described herein. The actuator is responsive to fluid signals to apply and release brakes on the rail vehicle.

Figure 10:
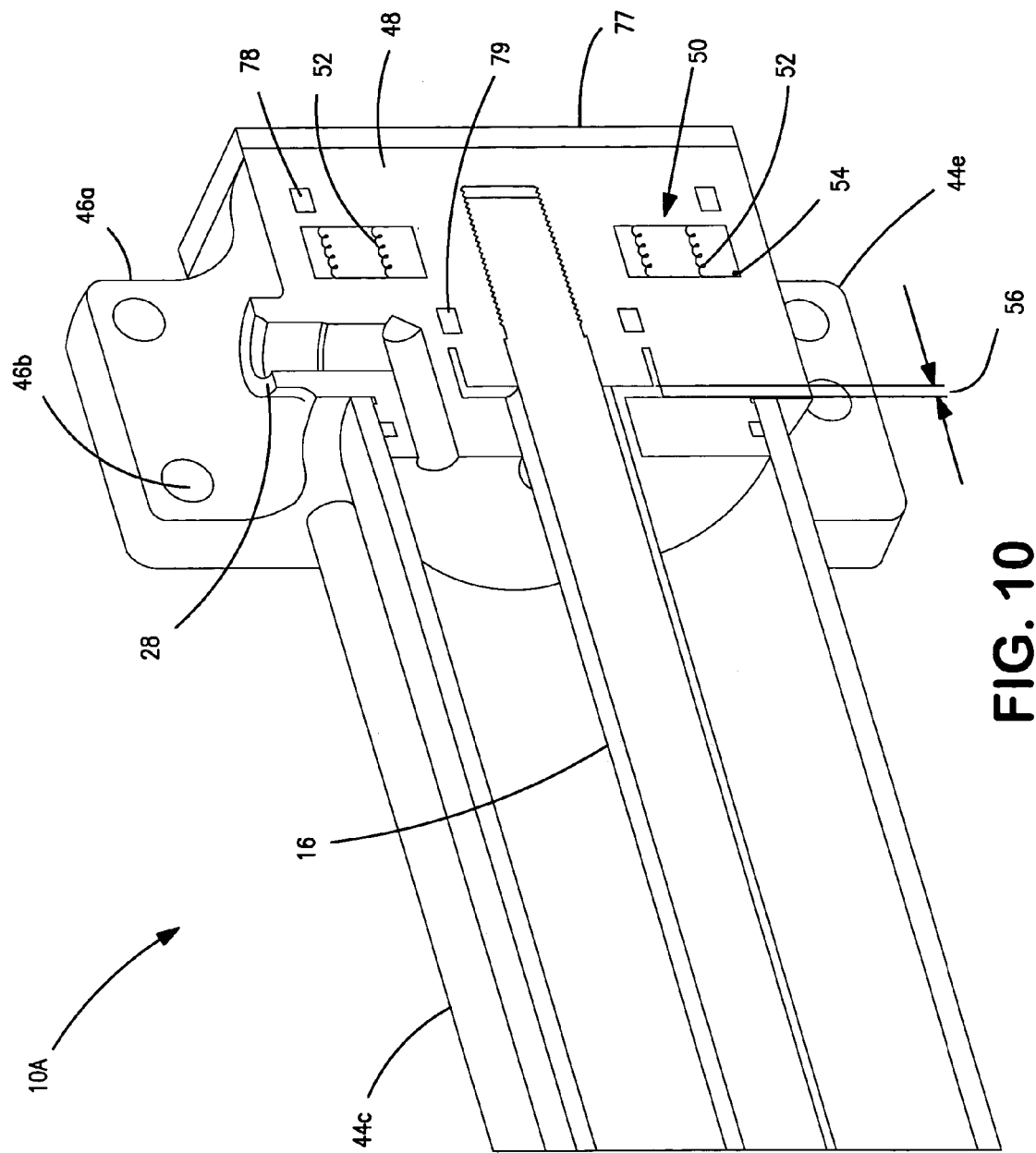
FIG. 10 is an enlarged perspective cut-a-way view of a portion of the actuator of FIG. 9.
Figure 11:
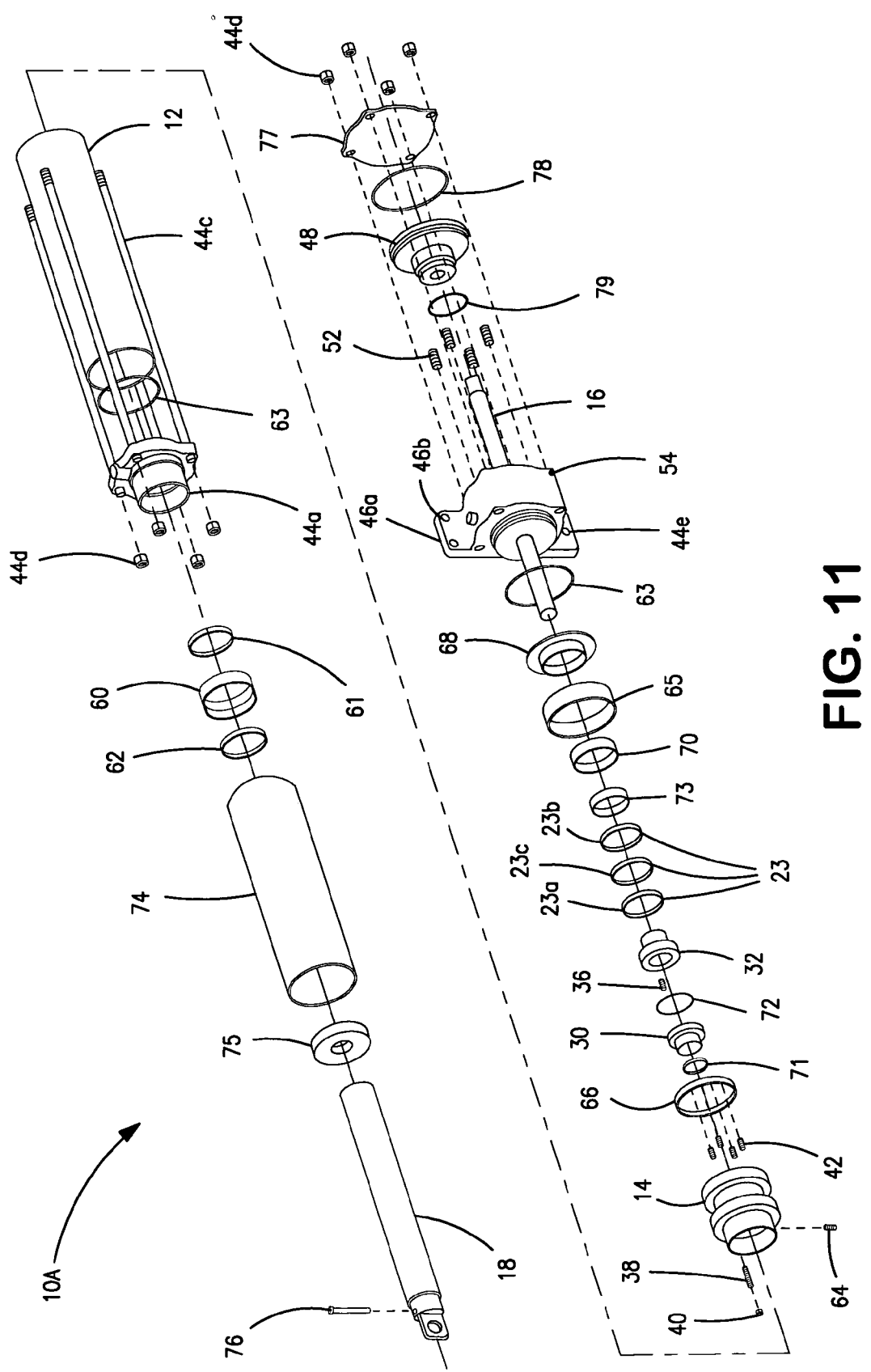
FIG. 11 is an exploded view of the actuator of FIG. 9.

An embodiment of an actuator 10 is shown, for example, in FIGS. 1-8. Another embodiment, actuator 10A, is shown in FIGS. 10-11. And, another embodiment, actuator 10B, is shown as part of a parking brake 200 in FIG. 12. The actuator 10 of FIGS. 1-8, including its structure and operation, will be discussed first, although references to the other embodiments may be included for convenience of description.

Figure 1:
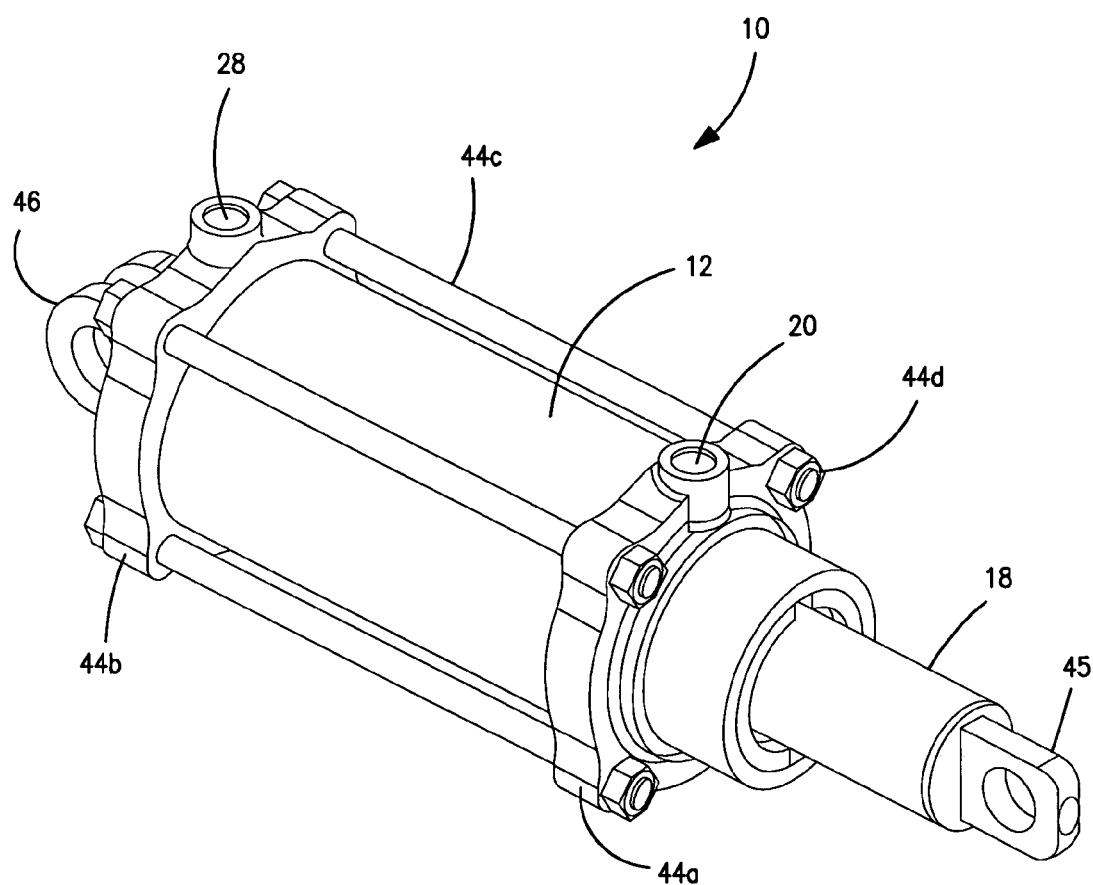
FIG. 1 is a perspective view of an embodiment of an actuator, according to the principles of the present disclosure.
Figure 2:
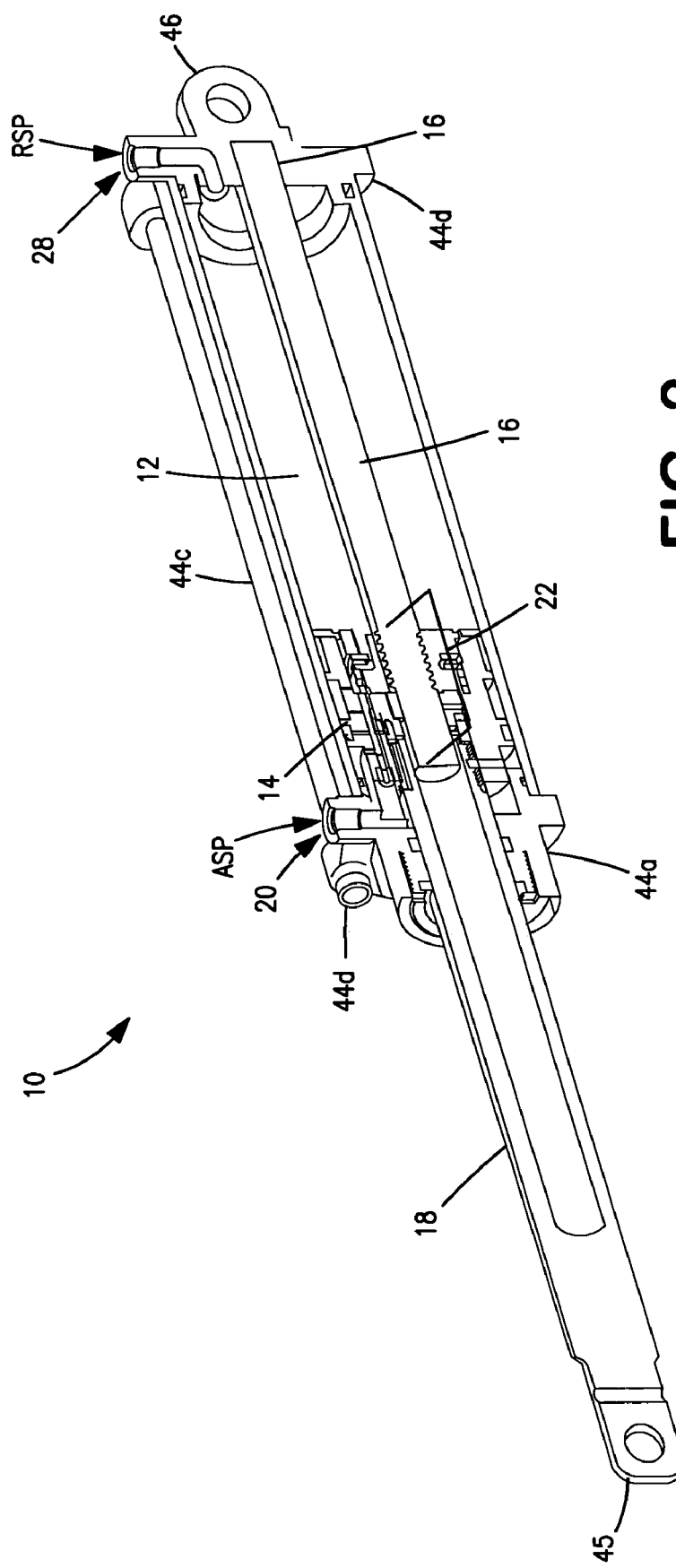
FIG. 2 is a cut-a-way perspective view of the embodiment of FIG. 1.
Figure 3:
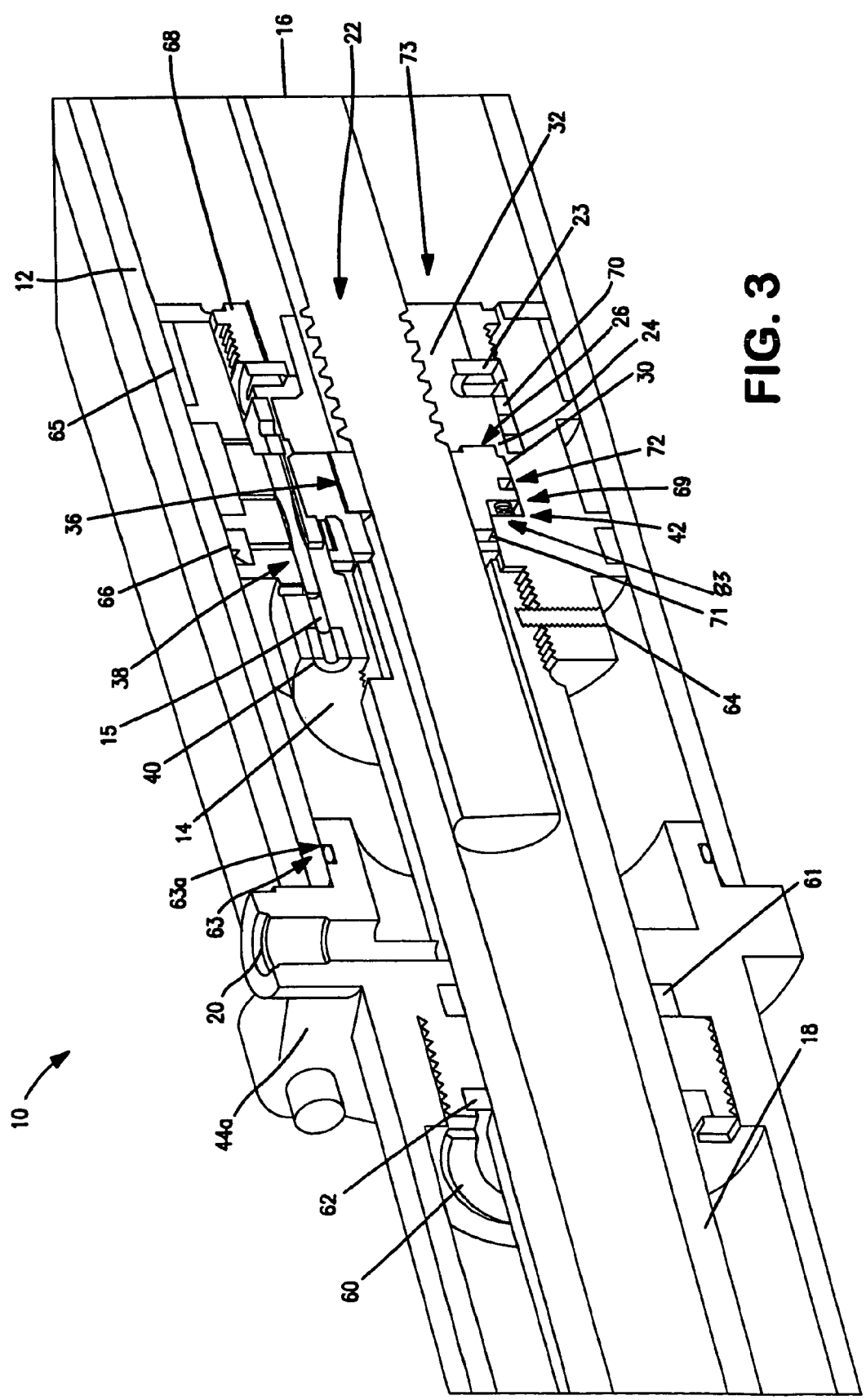
FIG. 3 is an enlarged partial cut-a-way perspective view of the actuator of FIG. 2.
Figure 4:
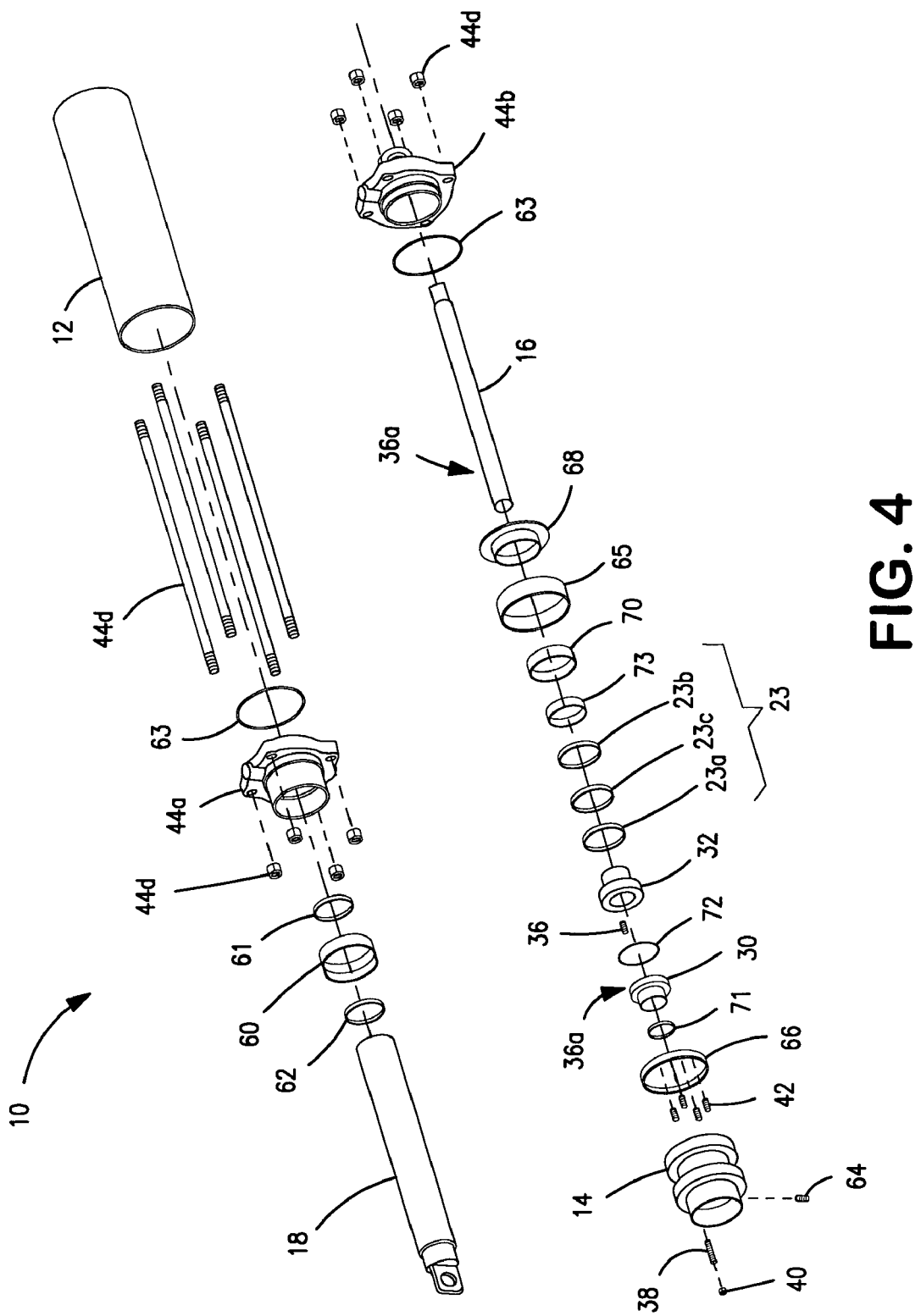
FIG. 4 is an exploded view of the actuator of FIG. 2.
Figure 5:
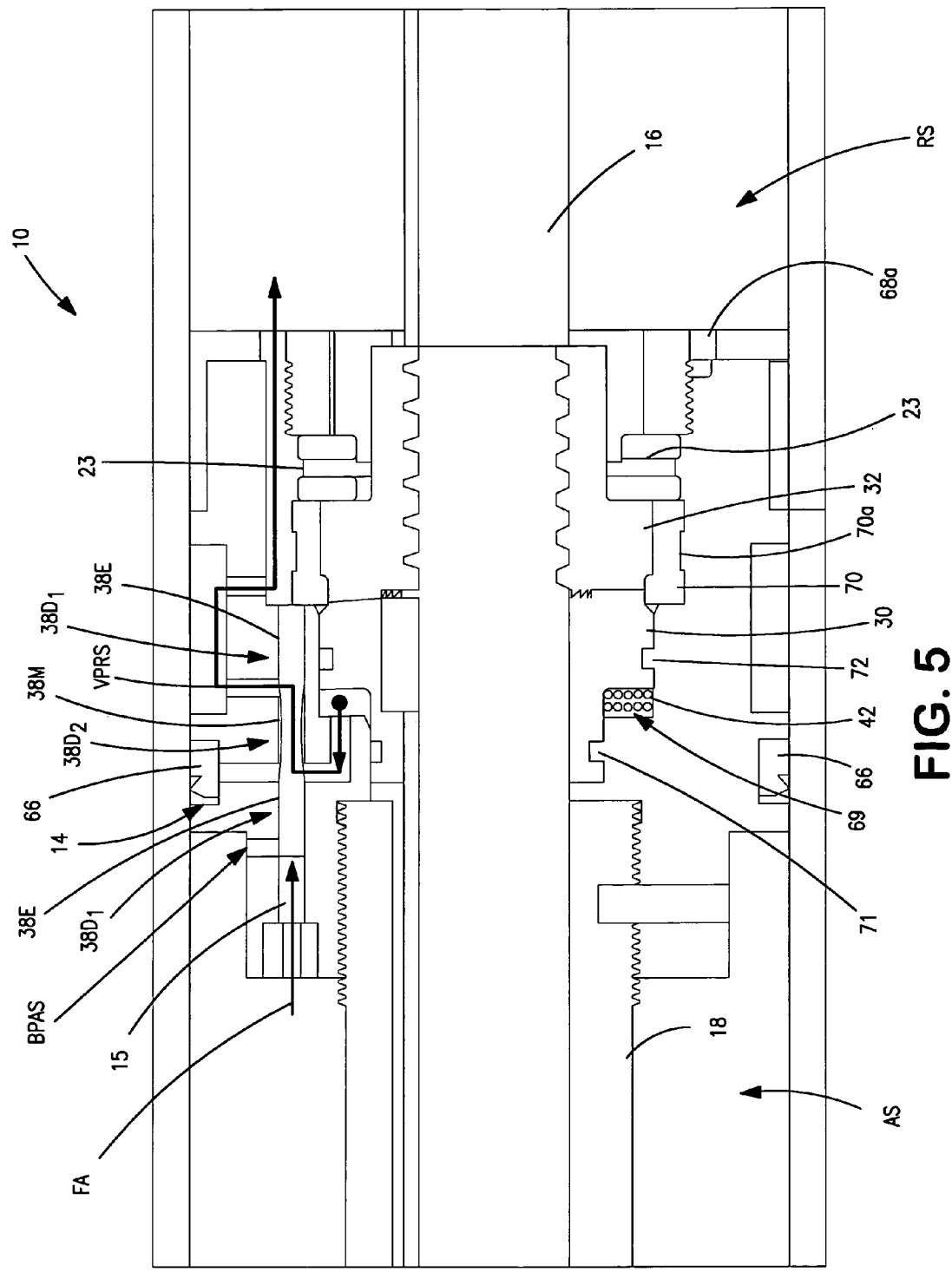
FIG. 5 is an enlarged view of a locking mechanism of the present disclosure in an applied position.

As shown in FIGS. 1-6, actuator 10 includes a cylinder 12 and a pressure piston 14 carried inside cylinder 12. Actuator 10 also includes a shaft 16, which may be stationary. A rod 18 is connected to the pressure piston 14, with the rod 18 being movable axially with respect to and concentrically over the shaft 16. The actuator 10 also has an apply or first port 20 for receiving an apply side fluid pressure ASP to move the pressure piston 14 to an applied position, as shown in FIGS. 3 and 5. Actuator 10 further includes a locking mechanism 22 to lock the pressure piston 14 in an applied or first position. The locking mechanism 22 is located inside the pressure piston 14, as shown in FIGS. 2, 3, 5 and 6. The locking mechanism 22 includes a first surface 24 and a second surface 26, with both surfaces 24, 26 adapted to travel with the pressure piston 14 (see FIG. 3).

Figure 6:
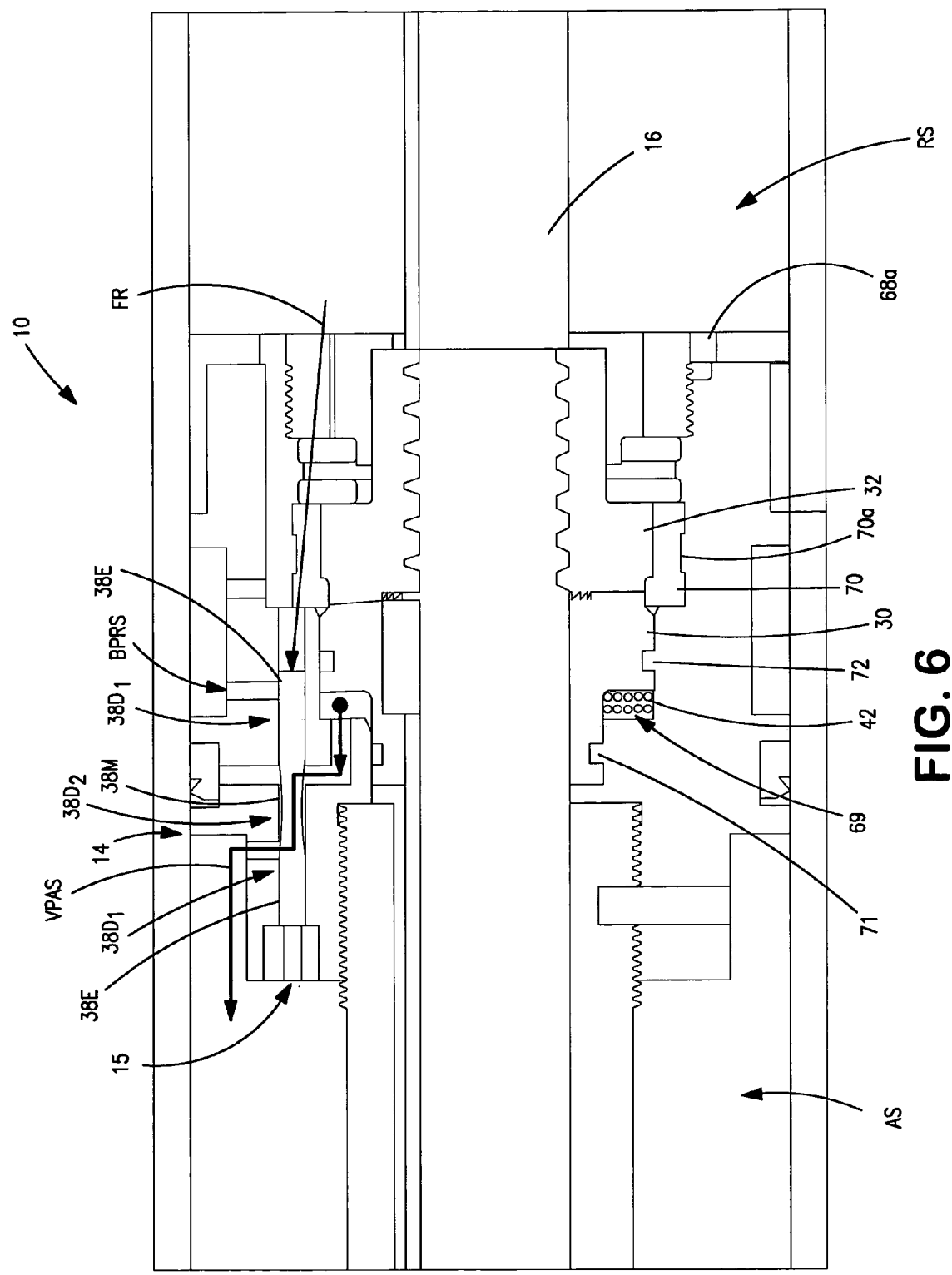
FIG. 6 is an enlarged view of a locking mechanism of the present disclosure in a released position.
Figure 7:
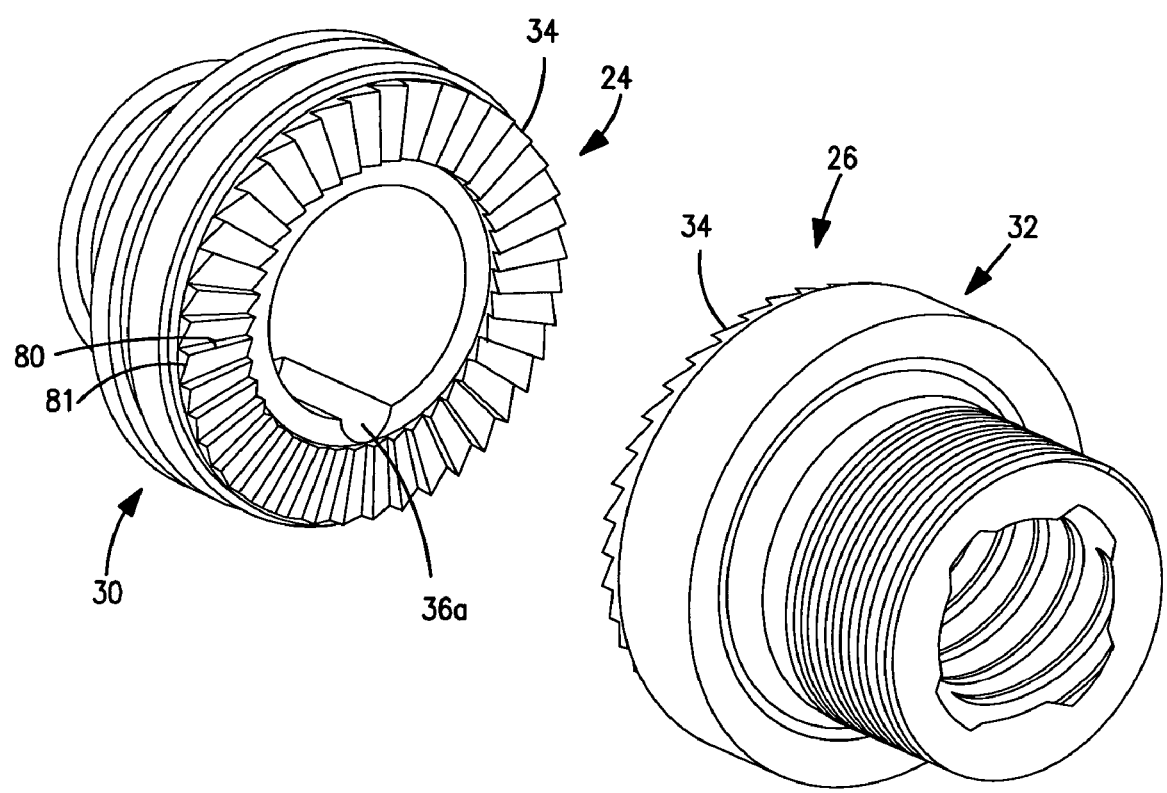
FIG. 7 is a perspective view of a locking sleeve and locking nut of the locking mechanism of the present disclosure, in an axially opposed position.
Figure 8:
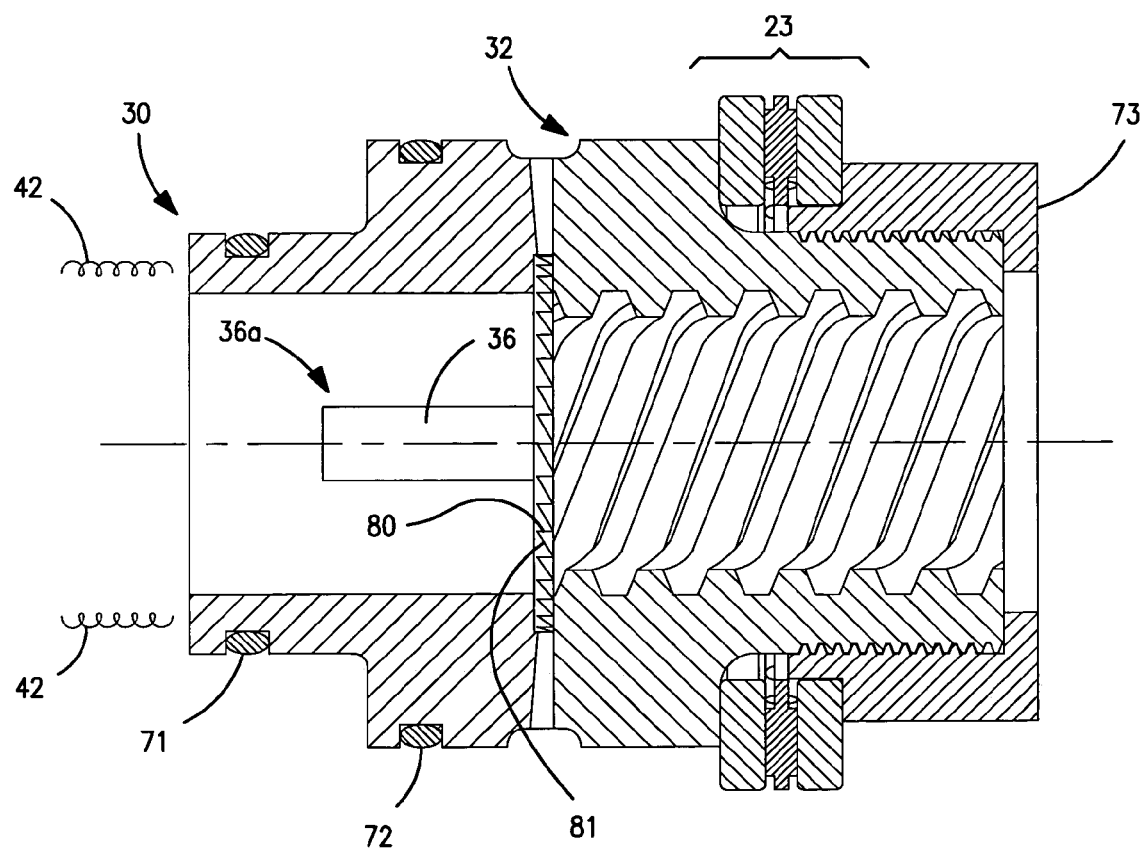
FIG. 8 is a lateral cross-sectional view of the locking nut and locking sleeve of the present disclosure, in an engaged position.

The first and second surfaces 24, 26 may be axially opposed, as shown in FIGS. 2-8, and axially engageable and disengageable. The first surface 24 may be on a sleeve or locking sleeve 30 that may be rotationally fixed to the shaft 16. A dowel pin 36 or equivalent element can be used to rotationally fix the sleeve 30 to the shaft 16 via dowel pin slots or openings 36a on the sleeve 30 and the shaft 16. However, the sleeve 30 may move axially along the shaft 16 with the pressure piston 14. The second surface 26 may be on a nut or locking nut 32 that may be threadably received and rotatable on the shaft 16. The nut 32 may also move axially with respect to the cylinder 12. The surfaces 24, 26 may include teeth 34, as shown in FIGS. 7-8.

The surfaces 24, 26 are movable along the shaft 16 with the pressure piston 14, in response to the apply side fluid pressure ASP at the apply port 20. The surfaces 24, 26 engage and lock the pressure piston 14 in an applied position, and in turn lock the parking brake of the rail vehicle, upon removal of the apply side fluid pressure ASP at the apply port 20.

The actuator 10 may also include a release or second port 28 for receiving a release side fluid pressure RSP. The surfaces 24, 26 of the locking mechanism 22, in response to the release side fluid pressure RSP at the release or second port 28, disengage and unlock the pressure piston 14 from its locked or applied position. The surfaces 24, 26 move along the shaft 16 with the pressure piston 14 to a released position which, in turn, releases the parking brake of the vehicle.

The locking mechanism 22 may include a fluid lock holding the locking surfaces 24, 26, engaged. As shown in FIGS. 3, 5 and 6, the sleeve 30 is in a portion of a piston bore 83 of pressure piston 14, forming a fluid locking chamber or cavity 69 between sleeve 30 and a wall of pressure piston 14. The fluid locking cavity 69 is vented by a venting device that includes moveable element 38. The movable element 38 is in a bore 15 of pressure piston 14 (see FIGS. 3, 5 and 6). The movable element 38, shown as a multi-diameter shuttle pin, is responsive to apply side fluid pressure ASP and/or release side fluid pressure RSP and vents fluid from cavity 69 (see FIGS. 3, 5 and 6) externally to the pressure piston 14. Cavity 69 is more fully discussed later herein.

The shuttle pin 38 shown in FIGS. 3, 5 and 6 has two different diameters. The first diameter 38D1 is at a portion of each end 38E of the shuttle pin 38. The second diameter 38D2 is at an intermediate or middle portion 38M of shuttle pin 38, between the ends 38E. The diameter 38D1, as shown in FIGS. 3, 5 and 6, is greater than the diameter 38D2. The differing diameters, 38D1 and 38D2, permit the shuttle pin 38 to connect and disconnect various bores in the pressure piston 14 so as to create paths, such as VPAS and VPRS, for fluids to flow to shuttle pin 38 and in and out of cavity 69. The operation of shuttle pin 38 will be more fully discussed later herein.

The pressure piston 14 may also include an element or stop 40, in the bore 15, essentially co-axial with the shuttle pin 38. The stop 40 retains shuttle pin 38 in the bore 15 and has an opening to allow fluid from apply port 20 to reach the shuttle pin 38. The stop 40 is shown, for example, as a threaded element, but it could be any equivalent type of element.

It should be noted that the fluid referred to in the present disclosure may be, for example, hydraulic liquid or air. If the fluid is hydraulic or an equivalent liquid, then the shuttle pin 38 and stop 40 may be included to facilitate the venting of the fluid. If the fluid is air, then the shuttle pin 38 and stop 40 may not be included, but other venting mechanisms (not shown) may be included to vent the air from cavity 69.

The locking mechanism 22 may further include at least one spring 42 situated between a wall of the pressure piston 14 and the sleeve 30 (see FIG. 3). The at least one spring 42 biases the first surface 24 of sleeve 30 toward the second surface 26 of nut 32. Further included as part of the locking mechanism 22 may be a thrust bearing 23 that is assigned to the nut 32. The thrust bearing 23 is situated between the walls of a piston cap 68 and spacer 70 (see FIG. 3). The thrust bearing 23 may include two or more plates 23a, 23b with races (not shown) to receive bearings that are on both sides of a roller 23c. The configuration of the thrust bearing 23 is such that when a force is applied to one of the plates, for example 23a, thrust bearing 23 will assist the nut 32 to rotate in one direction, and when a force is applied to another of the plates, for example 23b, the thrust bearing 23 will assist the nut 32 to turn in an opposite direction.

As shown in FIGS. 1 and 2, actuator 10 may also include a first end cap 44a and a second end cap 44b enclosing cylinder 12. End caps 44a and 44b are connected via studs 44c which are secured by nuts 44d. Also included may be a clevis-type mounting 46 configured to mount and/or secure actuator 10 to a rail vehicle (not shown).

A further description of actuator 10 continues with particular reference to FIGS. 3 and 4. Actuator 10 may have a seal cap 60, made of a bearing material, and connected to end cap 44a via, for example, a screwed connection. Cap 60 provides a running surface for rod 18. Lip seal 61, between seal cap 60 and a wall of end cap 44a, seals off rod 18 and prevents fluid leakage external to actuator 10. Wiper 62, which is mounted between rod 18 and seal cap 60 and which may be made of plastic, prevents debris from penetrating past the seal cap 60. There is an O-ring 63 located in a recess 63a on end cap 44a sealing a space between the end cap 44a and the cylinder 12.

The pressure piston 14 and rod 18 may be threadably connected at one end, as shown in FIG. 3, or they may be a one-piece unit (not shown). A set screw 64 mechanically locks rod 18 and pressure piston 14 to prevent unscrewing. The other end of rod 18 is configured to provide a connection 45 (see FIGS. 1-2) for a chain or equivalent-type connection device (not shown) to a brake cylinder, lever, brake beam or equivalent device (see FIG. 12 and description of actuator 10B) to apply and release the parking brake of the vehicle.

A wear ring 65, located in a recess of piston 14, and which may be made of bearing material, provides a running surface between the pressure piston 14 and cylinder 12, thereby preventing surface-to-surface metal contact of the cylinder 12 and piston 14. In addition, a lip seal 66, located in another recess of pressure piston 14, and which may include a plastic wear ring and rubber seal ring, also provides a protective running surface between cylinder 12 and piston 14. Lip seal 66 also essentially seals and separates an apply side AS of actuator 10 (to the left in FIGS. 3, 5 and 6) from a release side RS (to the right in FIGS. 3, 5 and 6).

As shown in FIG. 3, locking mechanism 22 elements, including, for example, the sleeve 30 and nut 32, may be captured in pressure piston 14 by the threaded connection between pressure piston 14 and a piston cap 68. The pressure piston 14 and piston cap 68 may be pinned together to prevent unscrewing (not shown).

When fluid is pumped in through the apply port 20 and release port 28 during apply and release operations, respectively, sleeve 30 travels with piston 14. Cavity 69 has been separately filled with fluid, which may be, for example, air or hydraulic liquid. When cavity 69 is filled, for example, with hydraulic fluid, sleeve 30, being biased toward nut 32 by the at least one spring 42 and surrounded by the hydraulic fluid, may not be able to move axially with respect to nut 32 unless some hydraulic fluid is vented out of cavity 69. Such a venting would allow surfaces 24, 26 of sleeve 30 and nut 32, respectively, to ride in an up-and-down motion on ramps 81 of each surface 24, 26 (see FIGS. 7-9). The relative movements of sleeve 30 and nut 32 via ramps 81 on their surfaces 24, 26, respectively, are discussed later herein (see FIGS. 7 and 8).

Thus, the pressure piston 14 houses shuttle pin 38 in bore 15 (see FIGS. 3, 5, 6) to vent the fluid in cavity 69 when fluid is provided at apply port 20 or release port 28. Shuttle pin 38 may be inserted in bore 15 and retained therein by stop 40 and a spacer 70. O-rings 71 and 72 seal off and isolate cavity 69 from hydraulic fluid located elsewhere in piston 14. Hydraulic fluid may only be vented from cavity 69 and only enter cavity 69 through venting paths VPAS and VPRS, as shown in FIGS. 5 and 6 and discussed in more detail later herein.

Thrust bearing 23 is captured by a threaded connection between locking nut 32 and a nut cap 73. The locking nut 32 and nut cap 73 may be pinned together to prevent unscrewing (not shown).

With regard to the operation of actuator 10, the piston 14 is filled with hydraulic fluid, as is cavity 69. Cavity 69 is sealed off from other hydraulic fluid in pressure piston 14 by O-rings 71 and 72. As referred to earlier herein, the hydraulic fluid in cavity 69 acts to at least partially inhibit axial movement of sleeve 30 with respect to nut 32, particularly as sleeve 30 travels with piston 14 during both apply and release operations. As also mentioned earlier herein, shuttle pin 38 facilitates a venting of the hydraulic fluid from cavity 69 via venting paths VPAS and VPRS, thus permitting axial movement of sleeve 30. The shuttle pin 38 also facilitates a re-entering of hydraulic fluid into cavity 69 as sleeve 30 oscillates in a ramp 81-to-ramp 81 up-and-down motion with nut 32. It should be again noted that, if the fluid in cavity 69 is air, vented to atmosphere, shuttle pin 38, stop 40 and paths VPAS and VPRS may not be the appropriate structure to vent cavity 69.

FIGS. 1 and 6 show actuator 10 in a pressure piston 14 release position. To apply the parking brake using actuator 10, fluid is pumped into apply port 20. That fluid acts as a force FA, which is also represented by apply side fluid pressure at apply port 20. Under fluid force FA, the multi-diameter shuttle pin 38 moves to the right (see FIG. 5) which permits a venting of fluid from cavity 69 to release side RS via venting path VPRS (to the right in FIG. 5) of actuator 10. That venting of fluid permits sleeve 30 to move axially relative to nut 32, as further discussed below. Venting of fluid to apply side AS is prevented by blocked passage BPAS. The fluid force FA overcomes various seal functions and causes pressure piston 14 to move to the right, as shown in FIGS. 3 and 5. The pressure piston 14 was able to move to the right because of a disengaging of surfaces 24 and 26 of locking mechanism 22, (see FIGS. 7-8). The disengagement of surfaces 24 and 26 permits the locking nut 32 to rotate on shaft 26 with the assistance of and against the thrust bearing 23. The rotation of nut 32 is facilitated by a force acting on spacer 70 and nut 32 that transfers a force to plate 23a of thrust bearing 23 which engages bearings 23c to assist in the turning of nut 32. With the venting of cavity 69 and disengagement of surfaces 24 and 26 (more fully discussed below), locking sleeve 30 is able to travel along shaft 26 with pressure piston 14.

Surfaces 24 and 26 on sleeve 30 and nut 32, respectively, are axially opposed and have fixed half v-shaped teeth that are mirror images of each other, as shown in FIGS. 7-8. The teeth 34 are designed with approximately 90° shoulders 80, and ramps 81. The shoulders 80 allow the sleeve 30 and nut 32 to lock up with each other in a first direction of rotation of the nut 32. The ramps 81 allow the nut 32 to maintain continuous contact with a ramp 81-to-ramp 81, up-and-down repetitive motion in an opposite or second direction of rotation. Such ramp 81-to-ramp 81 contact does not lock the sleeve 30 with the nut 32. During the ramp 81-to-ramp 81 movement of the surfaces 24 and 26, fluid may be continually vented from cavity 69 and also may be allowed to continually reenter cavity 69, corresponding to the ramp 81-to-ramp 81 movements or oscillations of sleeve 30 or nut 32.

The at least one spring 42, shown as four springs 42 in FIG. 4, biases first surface 24 of the sleeve 30 to engage second surface 26 of nut 32. As fluid force FA on pressure piston 14 continues, first surface 24 and second surface 26 remain in ramp 81-to-ramp 81 contact as the nut 32 rotates on shaft 16. The nut 32 travels with pressure piston 14, but does not move axially with respect to the pressure piston 14. The locking sleeve 30, because of dowel pin 36, located in slots 36a of the sleeve 30 and shaft 16 (see FIG. 4), will only move axially with respect to shaft 16 but will not rotate with respect to the shaft 16 or pressure piston 14.

As apply side fluid pressure ASP continues to be applied at apply port 20, fluid on the release side RS of pressure piston 14 is displaced out release port 28. That fluid includes an amount vented from cavity 69 via shuttle pin 38, as shown in FIG. 5. Either by a predetermined pressure, for example, by a relief valve setting in, for example, pump 220 of FIG. 12, or a termination of apply side fluid pressure ASP at apply port 20, movement of pressure piston 14 will stop.

When the apply side fluid pressure ASP is relieved at apply port 20, the locking nut 32 will begin to retract or rotate in an opposite direction (move to the left as viewed in FIGS. 3 and 5) due to brake shoe forces that were just applied by the movement of pressure piston 14 and rod 18 (to the right in FIGS. 3 and 5) in applying the parking brake. During the apply operation, the locking nut 32 and locking sleeve 30 had remained in ramp 81-to-ramp 81 contact. The shuttle pin 38, with the removal of apply side fluid pressure ASP and force FA, will remain essentially in the position shown in FIG. 5, unless the actuator 10 is mounted such that gravity may cause a movement of the shuttle pin 38. The locking nut 32, now rotating in the opposite direction, will have its surface 26 rotating onto surface 24 of the locking sleeve 30 until the flats or shoulders 80 are fully engaged and locked (see FIG. 8). The actuator 10 is now mechanically locked in an applied position via locking mechanism 22, and the parking brake of the vehicle, via brake shoe force, is maintained in an applied position or condition. The actuator 10, with locking mechanism 22 is configured such that there are an infinite number of possible pressure piston 14 stroke distances, within design parameters of the actuator 10, in which the pressure piston 14 can be locked in an applied position. That is, the actuator 10, does not depend on the pressure piston 14 being in any particular position in order for the pressure piston 14 to be locked and maintained in an applied position.

To release the parking brake of the vehicle, release side fluid pressure RSP is introduced at release port 28. The release side fluid pressure RSP, in the form of fluid force FR, is applied to pressure piston 14 and locking sleeve 30, and in turn to springs 42, as shown in FIG. 6. The fluid force FR is fed through opening 68a in piston cap 68 and opening 70a in spacer 70. When the force of springs 42 is overcome, locking sleeve 30 is moved to the left as (as viewed in FIG. 6) along shaft 26. Surface 24 of sleeve 30 disengages from surface 26 of the nut 32, which disengages the locking mechanism 22. After surfaces 24 and 26 are disengaged, locking nut 32 is again free to rotate, but in an opposite direction from its rotation direction under apply side fluid pressure ASP. The rotation of nut 32 is facilitated by a force acting on piston cap 68 and, to a lesser extent, on nut cap 73. That in turn puts a force on plate 23b of thrust bearing 23 which engages rollers 23c to assist in the turning of nut 32.

Concurrently, release side fluid pressure RSP entering from release port 28 moves the multi-diameter shuttle pin 38 to the left under force FR (see FIG. 6), which vents cavity 69 to the apply side AS via venting path VPAS (see FIG. 6) of actuator 10. Venting to the release side RS is prevented by blocked passage BPRS.

As the release side fluid pressure RSP continues to increase at release port 28, fluid on the apply side AS end of pressure piston 14 is displaced out apply port 20. That fluid includes an amount vented from cavity 69 via shuttle pin 38, as shown in FIG. 6. At the same time, sleeve 30 moves to the left with pressure piston 14. Nut 32 rotates, with the assistance of thrust bearing 23, and also moves along with pressure piston 14 until the pressure piston 14 reaches end cap 44b. At this point, the pressure piston 14 is in a released position, as is the parking brake of the vehicle. When release side fluid pressure RSP is relieved at release port 28, the shuttle pin 38 will remain essentially in the position shown in FIG. 6, unless the actuator 10 is mounted such that gravity may cause a movement of shuttle pin 38. The locking sleeve 30 will be forced toward locking nut 32 by springs 42 and surfaces 24 and 26 will be engaged and ready for another parking brake apply cycle.

Figure 9:
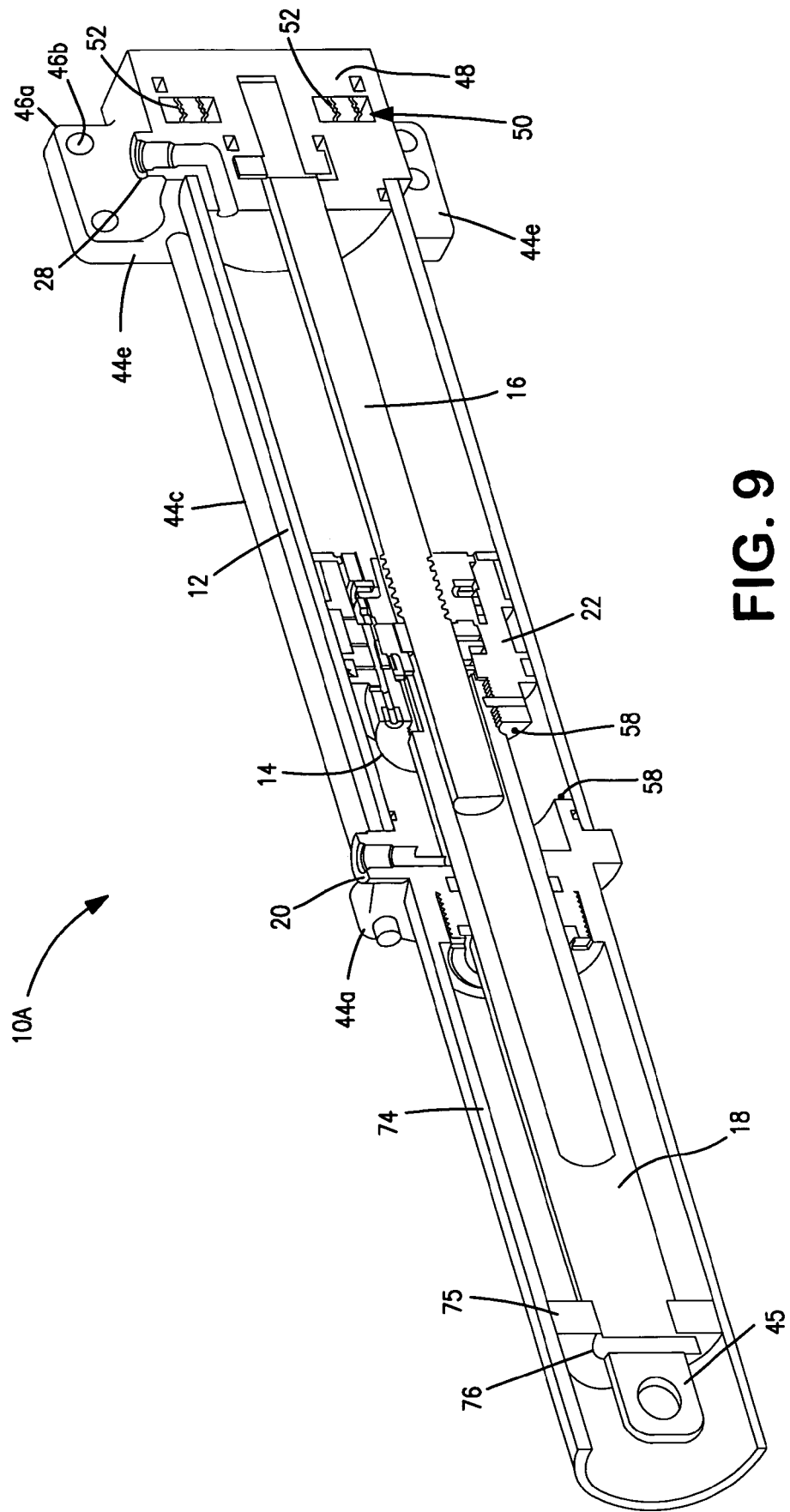
FIG. 9 is a perspective cut-a-way view of another embodiment of an actuator, according to the principles of the present disclosure.

Another embodiment, actuator 10A, is shown in FIGS. 9-11. Actuator 10A is generally configured and operates essentially the same as actuator 10 of FIGS. 1-8, except for the following. Actuator 10A is structured and configured to provide indicators of piston load, fluid pressure and piston position. Actuator 10A includes a load piston 48 located inside a second end cap 44e, which is configured differently from second end cap 44b. The load piston 48 may be threadably connected to shaft 16. A threaded connection between load piston 48 and shaft 16 may be pinned to prevented unscrewing (not shown). Shaft 16 may be slightly movable axially, for a special purpose, as described below. A load sensing cavity 50 may be formed between the load piston 48 and the second end cap 44e. The cavity 50 may be filled with fluid, which may be hydraulic fluid or another equivalent medium. Or, a force or pressure sensing device (not shown) can be included in the cavity 50 or used instead of the cavity 50. The cavity 50 may further include at least one spring 52, mounted to second end cap 44e. The at least one spring 52, shown as four springs 52 in FIG. 11, biases the load piston 48 to the right, as viewed in FIG. 9. That biasing is to ensure a maximum fluid fill of the cavity 50. Actuator 10A may further include O-rings 78 and 79, located in recesses of piston 48 and between piston 48 and second end cap 44e. The O-rings 78 and 79 seal the fluid in cavity 50.

Actuator 10A may further include a load sensor 54, either mechanical or electrical, connected to the cavity 50. The sensor 54 is configured to measure fluid pressure in the cavity 50 and to provide an indication of whether the pressure piston 14 is locked in an applied position and the parking brake is applied. That indication is possible because, when the apply side fluid pressure ASP has been relieved or removed from the apply port 20, a tension or load is placed on the shaft 16. The shaft 16 will move ever so slightly, but enough so that load piston 48 moves to the left (in FIGS. 9-11) and increases pressure in cavity 50. The second end cap 44e includes a load piston gap 56 between the load piston 48 and a wall of second end cap 44e. The gap 56 is sealed from cavity 50 by O-ring 79. The gap 56 may be configured such that if fluid leakage somehow occurs from the cavity 50, and fluid pressure is reduced, while an indication by sensor 54 of an applied parking brake condition or locked pressure piston 14 may be lost because of the leakage, the pressure piston 14 will still actually be locked in an applied position and the parking brake of the vehicle will still be applied.

The embodiment of FIGS. 9-11 may also include one or more position sensing devices 58. Devices 58 may be, for example, a pair of electrical or mechanical contacts, which, for convenience, is shown in FIG. 9 only. The one or more position sensing devices 58 may be located on the pressure piston 14 and/or the first end cap 44a, or elsewhere on or in actuator 10A, to detect and indicate when the pressure piston 14 is in the released position and thus the parking brake of the vehicle has been released.

As shown in FIGS. 9-11, actuator 10A may have a rod protection tube 74, mounted to or formed monolithically with first end cap 44a and a ring 75 retained by a pin 76, to provide environmental protection for the rod 18.

Additionally, actuator 10A may include a cover 77 to close off the piston 48. The cover 77 is secured to second end cap 44e by studs 44c and nuts 44d.

The second end cap 44e of actuator 10A is configured differently than the second end cap 44b of the embodiment of actuator 10. Instead of the clevis 46 mounting configuration of actuator 10, actuator 10A includes a side-facing mount 46a with four openings 46b to secure actuator 10A to a rail vehicle (not shown).

The operation of actuator 10A is essentially the same as for actuator 10, except for the operation of load 48 with its load/pressure indicator 54, and the one or more position sensing devices 58, all as described above.

Figure 12:
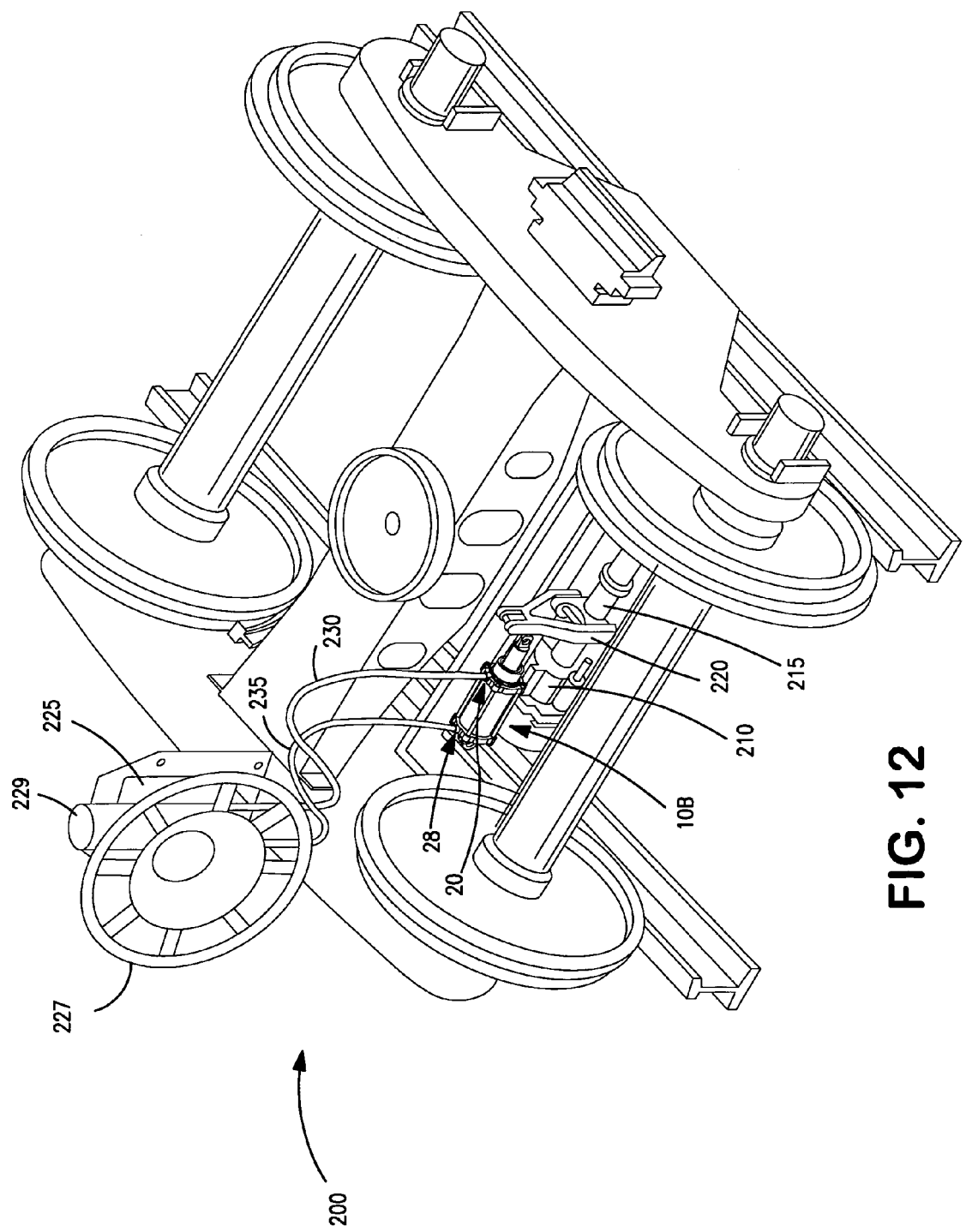
FIG. 12 is a perspective view of another embodiment of an actuator, incorporated in a parking brake, according to the principles of the present disclosure.

Another embodiment, actuator 10B, is shown in FIG. 12 mounted as part of parking brake 200. Actuator 10B is mounted to brake cylinder 210, which is mounted on a rail vehicle truck. Actuator 10B is operatively connected via clevis 45 to lever 220 that is connected to brake cylinder 210. The lever 220 is responsive to forces to move a brake piston 215 of brake cylinder 210 to apply and release the rail vehicle's brakes. One of the forces may emanate from a pneumatic and/or electrical system, one or both of may operate a rail vehicle's and a train's brakes. Another force may come from a manual, hydraulic and/or electric parking brake, such as the hydraulic parking brake 200. Parking brake 200 may include a pump 225 which may be mounted to a body or truck of a rail vehicle (not shown) and be operatively connected to the actuator 10B by, for example, hoses 230, 235. The pump 225 may be manual-hydraulically operated using wheel 227, which could, alternatively, be a handle or equivalent device. The pump may also be electric-hydraulically operated (not shown). The pump 225 has a fluid reservoir 229 and provides the apply side fluid pressure ASP to the apply port 20 of the actuator 10 via hose 230 and provides release side fluid pressure RSP to the release port 28 via hose 235.

The operative connection of clevis 45 to lever 220 of brake cylinder 210 is of such configuration, for example, a chain (not shown), that the actuator rod 18 of actuator 10B will not be affected by forces provided or applied directly to brake cylinder 210 from sources other than pump 225. In a parking brake 200 released position, the chain is limp or without tension. When the parking brake 200 is applied via actuator 10B, the chain becomes taut by the movement of actuator rod 18. The lever 220 is moved to the left (in FIG. 12) during the parking brake 200 apply operation. When the parking brake 200 is released via operation of actuator 10B, the lever 220 is returned to its original condition by springs (not shown) in brake cylinder 210.

The pump 225 and actuator 10 may be formed as one unit without a need for hoses 230, 235. That monolithic or unitary unit maybe mounted at a convenient location on the rail vehicle and connected directly or indirectly to the brakes of the vehicle.

Actuators 10, 10A and 10B have locking mechanisms 22 to lock the pressure piston 14 in an applied position. Therefore, pressurization is not needed to maintain the parking brake in an applied position.

Since the locking mechanism 22 is only operational after the apply side fluid pressure ASP is received at apply port 20 of actuators 10, 10A and 10B, a fluid pressure, for example, release side fluid pressure RSP, is not necessary to keep the parking brake released.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

We claim:

1. An actuator responsive to fluid signals to extend and retract a piston, the actuator comprising:
    a cylinder;
    a pressure piston carried inside the cylinder;
    a shaft;
    a rod connected to the pressure piston, and the rod to be connected to a device to be moved;
    a first port configured to receive a fluid pressure to move the pressure piston to a first position; and
    a locking mechanism inside a portion of a piston bore of the pressure piston, the locking mechanism including a first surface and a second surface, with both surfaces traveling with the pressure piston along the shaft in response to the fluid pressure at the first port, and the surfaces locking the pressure piston in the first position upon removal of the fluid pressure at the first port.

2. The actuator of claim 1, further including a second port configured to receive a fluid pressure, and, in response to the fluid pressure at the second port, the surfaces of the locking mechanism unlock and are configured to move along the shaft with the pressure piston to a second position.

3. The actuator of claim 1, wherein the rod is moveable axially with respect to and concentrically over the shaft.

4. The actuator of claim 1, wherein the first and second surfaces are axially opposed and axially engageable and disengageable.

5. The actuator of claim 1, wherein the first surface is on a sleeve rotationally fixed to the shaft.

6. The actuator of claim 5, wherein the locking mechanism further includes a dowel pin that rotationally fixes the sleeve to the shaft.

7. The actuator of claim 1, wherein the second surface is on a nut threadably received and rotatable on the shaft.

8. The actuator of claim 7, wherein the nut is movable axially with respect to the cylinder.

9. The actuator of claim 5, wherein the sleeve is moveable axially along the shaft.

10. The actuator of claim 1, wherein the first and second surfaces include teeth.

11. The actuator of claim 1, wherein the locking mechanism is in a fluid chamber and further includes a moveable element responsive to fluid pressure to vent fluid externally to the pressure piston.

12. The actuator of claim 11, wherein the moveable element is a multi-diameter shuttle pin.

13. The actuator of claim 11, wherein the pressure piston includes at least one element having an opening allowing fluid pressure to reach the moveable element.

14. The actuator of claim 12, wherein the differing diameters of the multi-diameter shuttle pin permits the shuttle pin to connect and disconnect bores in the pressure piston so as to create paths for fluid to flow to the shuttle pin and in and out of the fluid chamber.

15. The actuator of claim 1, wherein the locking mechanism includes a fluid-filled cavity generally maintaining the first and second surfaces locked, and a venting device responsive to fluid pressure at the first port to vent the cavity and allow the first and second surfaces to unlock.

16. The actuator of claim 2, wherein the locking mechanism includes a fluid-filled cavity generally maintaining the first and second surfaces locked, and a venting device responsive to fluid pressure at the second port to vent the cavity and allow the first and second surfaces to unlock.

17. The actuator of claim 15, wherein the venting device includes a multi-diameter shuttle pin.

18. The actuator claim 16, wherein the venting device includes a multi-diameter shuttle pin.

19. The actuator of claim 1, wherein the locking mechanism further includes at least one spring biasing the first surface toward the second surface.

20. The actuator of claim 1, wherein the locking mechanism further includes a thrust bearing assigned to the second surface.

21. The actuator of claim 20, wherein the thrust bearing further includes plates with races and roller bearings, the thrust bearing configured such that when a force is applied to one plate of the thrust bearing, the nut is assisted in rotating in one direction, and when a force is applied to an opposite plate of the thrust bearing, the nut is assisted in rotating in an opposite direction.

22. The actuator of claim 1, wherein the shaft is stationary.

23. The actuator of claim 1, further including first and second end caps enclosing the cylinder.

24. The actuator of claim 23, wherein the second end cap includes a clevis mounting.

25. The actuator of claim 23, wherein the second end cap includes a side-facing mounting.

26. The actuator of claim 25, further including a load piston inside the second end cap, the load piston being connected to the shaft.

27. The actuator of claim 26, wherein the shaft and load piston are moveable axially.

28. The actuator of claim 26, wherein a load sensing cavity is formed between the load piston and the second end cap, the cavity being filled with fluid.

29. The actuator of claim 28, wherein the cavity further includes at least one spring providing a force biasing the load piston to ensure maximum fluid fill of the cavity.

30. The actuator of claim 28, further including a load sensor connected to the load sensing cavity, the sensor configured to measure fluid pressure in the load sensing cavity and to provide an indication that the pressure piston is in the first position.

31. The actuator of claim 28, the cavity further including a load piston gap configured such that if a fluid leakage occurs from the cavity and fluid pressure is thereby reduced, an indication that the pressure piston is in the first position will be lost but the pressure piston will still be in the first position.

32. The actuator of claim 2, further including first and second end caps enclosing the cylinder.

33. The actuator of claim 32, further including a position sensing device located on one or more of the pressure piston and the first end cap, the sensing device configured to detect and indicate when the pressure piston is in the first position.

34. The actuator of claim 23, further including a position sensing device located on at least one of the pressure piston and the first end cap, the sensing device configured to detect and indicate when the pressure piston is in the second position.

35. The actuator of claim 23, further including a rod protection tube connected to the first end cap.

36. The actuator of claim 1, wherein the actuator is configured to be mountable to one or more of a rail vehicle brake cylinder, a rail vehicle truck and the body of a rail vehicle.

37. An actuator for a parking brake for a rail vehicle, the actuator being responsive to fluid signals to apply and release brakes on the vehicle, the actuator comprising:
 a cylinder;
 a pressure piston carried inside the cylinder;
 a shaft;
 a rod connected to the pressure piston, and the rod to be connected to a parking brake;
 an apply port configured to receive a fluid pressure to move the pressure piston to an applied position; and
 a locking mechanism inside a portion of a piston bore of the pressure piston, the locking mechanism including a first surface and a second surface, with both surfaces traveling with the pressure piston along the shaft in response to the fluid pressure at the apply port, and the surfaces locking the pressure piston and the parking brake of the vehicle in the applied position upon removal of the fluid pressure at the apply port.

38. The actuator of claim 37, further including a release port configured to receive a fluid pressure, and, in response to the fluid pressure at the release port, the surfaces of the locking mechanism unlock and are configured to move along the shaft with the pressure piston to a released position, thereby releasing the parking brake of the vehicle.

39. The actuator of claim 37, wherein the rod is moveable axially with respect to and concentrically over the shaft.

40. The actuator of claim 37, wherein the first and second surfaces are axially opposed and axially engageable and disengageable.

41. An actuator responsive to fluid signals to extend and retract a piston, the actuator comprising:
 a cylinder;
 a pressure piston carried inside the cylinder;
 a shaft;
 a rod connected to the pressure piston, and the rod to be connected to a device to be moved;
 a first port configured to receive a fluid pressure to move the pressure piston to a first position;
 a locking mechanism inside the pressure piston, the locking mechanism including a first surface and a second surface, with both surfaces traveling with the pressure piston along the shaft in response to the fluid pressure at the first port, and the surfaces locking the pressure piston in the first position upon removal of the fluid pressure at the first port; and
 wherein the locking mechanism is in a fluid chamber and further includes a moveable element responsive to fluid pressure to vent fluid externally to the pressure piston.

42. An actuator responsive to fluid signals to extend and retract a piston, the actuator comprising:
 a cylinder;
 a pressure piston carried inside the cylinder;
 a shaft;
 a rod connected to the pressure piston, and the rod to be connected to a device to be moved;
 a first port configured to receive a fluid pressure to move the pressure piston to a first position;
 a locking mechanism inside the pressure piston, the locking mechanism including a first surface and a second surface, with both surfaces traveling with the pressure piston along the shaft in response to the fluid pressure at the first port, and the surfaces locking the pressure piston in the first position upon removal of the fluid pressure at the first port; and wherein the locking mechanism includes a fluid-filled cavity generally maintaining the first and second surfaces locked, and a venting device responsive to fluid pressure at the first port to vent the cavity and allow the first and second surfaces to unlock.

43. An actuator responsive to fluid signals to extend and retract a piston, the actuator comprising:

a cylinder;

a pressure piston carried inside the cylinder;

a shaft;

a rod connected to the pressure piston and movable axially with respect to and concentrically over the shaft, and the rod to be connected to a device to be moved;

a first port configured to receive a fluid pressure to move the pressure piston to a first position;

a locking mechanism inside the pressure piston, the locking mechanism including a first surface and a second surface, with both surfaces traveling with the pressure piston along the shaft in response to the fluid pressure at the first port, and the surfaces locking the pressure piston in the first position upon removal of the fluid pressure at the first port; and wherein the rod is moveable axially with respect to and concentrically over the shaft.

* * * * *